US008675769B1

(12) United States Patent  
Eliaz

(10) Patent No.: US 8,675,769 B1
(45) Date of Patent: Mar. 18, 2014

(54) CONSTELLATION MAP OPTIMIZATION FOR HIGHLY SPECTRALLY EFFICIENT COMMUNICATIONS

(71) Applicant: MagnaCom Ltd., Moshav Ben Shemen (IL)

(72) Inventor: Amir Eliaz, Moshav Ben Shemen (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 13/755,001

(22) Filed: Jan. 31, 2013

Related U.S. Application Data

(60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012.

(51) Int. Cl.
*H04K 1/02* (2006.01)

(52) U.S. Cl.
USPC ........... 375/295; 375/135; 375/146; 375/268; 375/271; 375/278; 375/298; 375/300

(58) Field of Classification Search
CPC ................. H03F 1/3247; H03F 1/3294; H03F 2201/3233; H04L 27/368; H04L 25/03343
USPC ......... 375/135, 146, 268, 271, 278, 295, 298, 375/300; 327/291; 332/106; 341/20, 173
See application file for complete search history.

(56) References Cited

U.S. PATENT DOCUMENTS

| | | | | |
|---|---|---|---|---|
| 7,467,338 B2 * | 12/2008 | Saul | ............................... | 714/712 |
| 8,248,975 B2 * | 8/2012 | Fujita et al. | .................... | 370/310 |
| 8,351,536 B2 * | 1/2013 | Mazet et al. | .................. | 375/295 |
| 2005/0047517 A1 * | 3/2005 | Georgios et al. | ............... | 375/267 |
| 2009/0290620 A1 * | 11/2009 | Tzannes et al. | ................ | 375/219 |
| 2011/0074506 A1 * | 3/2011 | Kleider et al. | ................. | 330/149 |
| 2011/0228869 A1 * | 9/2011 | Barsoum et al. | ............... | 375/261 |
| 2011/0274212 A1 * | 11/2011 | Edler Von Elbwart et al. | .............................. | 375/308 |
| 2013/0028299 A1 * | 1/2013 | Tsai | .............................. | 375/219 |

OTHER PUBLICATIONS

S. Mita, M. Izumita, N. Doi, and Y. Eto, "Automatic equalizer for digital magnetic recording systems" IEEE Trans. Magn., vol. 25, pp. 3672-3674, 1987.

(Continued)

*Primary Examiner* — Dhaval Patel
(74) *Attorney, Agent, or Firm* — McAndrews, Held & Malloy, Ltd.

(57) ABSTRACT

A method and system for optimizing symbol mapping in partial response based communications that are based on use of pulse-shaping that incorporates a predetermined amount of inter-symbol interference (ISI). Optimizing symbol mapping symbol mapping may comprise configuring optimized constellation mapping for use in mapping and/or de-mapping data communicated using the partial response pulse-shaping. In this regard, the optimized constellation mapping may be based on a reference constellation mapping that is utilized for reference modulation scheme, and the configuring comprises applying adjustments to one or more constellation points in the reference constellation mapping. The optimized constellation mapping may be configured to optimize an applicable minimum distance for one or more selected error patterns for a given spectral compression applied during partial response based communications. The configuring of the optimized constellation mapping may be based on feedback information provided during communication of data.

24 Claims, 6 Drawing Sheets

(56) References Cited

OTHER PUBLICATIONS

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

0. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Equalization: The Correction and Analysis of Degraded Signals, White Paper, Agilent Technologies, Ransom Stephens V1.0, Aug. 15, 2005 (12 pages).

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root-raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog•Iu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686, Nov. 1989.

* cited by examiner

CONSTELLATION MAP OPTIMIZATION FOR HIGHLY SPECTRALLY EFFICIENT COMMUNICATIONS

CLAIM OF PRIORITY

This patent application makes reference to, claims priority to and claims benefit from:

U.S. Provisional Patent Application Ser. No. 61/662,085 entitled "Apparatus and Method for Efficient Utilization of Bandwidth" and filed on Jun. 20, 2012;

U.S. Provisional Patent Application Ser. No. 61/726,099 entitled "Modulation Scheme Based on Partial Response" and filed on Nov. 14, 2012;

U.S. Provisional Patent Application Ser. No. 61/729,774 entitled "Modulation Scheme Based on Partial Response" and filed on Nov. 26, 2012; and U.S. Provisional Patent Application Ser. No. 61/747,132 entitled "Modulation Scheme Based on Partial Response" and filed on Dec. 28, 2012.

Each of the above identified applications is hereby incorporated herein by reference in its entirety.

INCORPORATION BY REFERENCE

This application makes reference to:

U.S. patent application Ser. No. 13/754,964 titled "Low-Complexity, Highly-Spectrally-Efficient Communications," and filed on the same date as this application;

U.S. patent application Ser. No. 13/754,998 titled "Design and Optimization of Partial Response Pulse Shape Filter," and filed on the same date as this application;

U.S. patent application Ser. No. 13/755,008 titled "Dynamic Filter Adjustment for Highly-Spectrally-Efficient Communications," and filed on the same date as this application;

U.S. patent application Ser. No. 13/755,011 titled "Timing Synchronization for Reception of Highly-Spectrally-Efficient Communications," and filed on the same date as this application;

U.S. patent application Ser. No. 13/755,018 titled "Feed Forward Equalization for Highly-Spectrally-Efficient Communications," and filed on the same date as this application;

U.S. patent application Ser. No. 13/755,021 titled "Decision Feedback Equalizer for Highly-Spectrally-Efficient Communications," and filed on the same date as this application;

U.S. patent application Ser. No. 13/755,025 titled "Decision Feedback Equalizer with Multiple Cores for Highly-Spectrally-Efficient Communications," and filed on the same date as this application;

U.S. patent application Ser. No. 13/755,026 titled "Decision Feedback Equalizer Utilizing Symbol Error Rate Biased Adaptation Function for Highly-Spectrally-Efficient Communications," and filed on the same date as this application;

U.S. patent application Ser. No. 13/755,028 titled "Coarse Phase Estimation for Highly-Spectrally-Efficient Communications," and filed on the same date as this application;

U.S. patent application Ser. No. 13/755,039 titled "Fine Phase Estimation for Highly Spectrally Efficient Communications," and filed on the same date as this application; and U.S. patent application Ser. No. 13/755,043 titled "Joint Sequence Estimation of Symbol and Phase with High Tolerance of Nonlinearity," and filed on the same date as this application.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

TECHNICAL FIELD

Aspects of the present application relate to electronic communications. More specifically, certain implementations of the present disclosure relate to constellation map optimization for highly spectrally efficient communications.

BACKGROUND

Existing communications methods and systems are overly power hungry and/or spectrally inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for constellation map optimization for highly spectrally efficient communications, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

The present disclosure relates to a method and system for constellation map optimization for highly spectrally efficient communications.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "exemplary" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
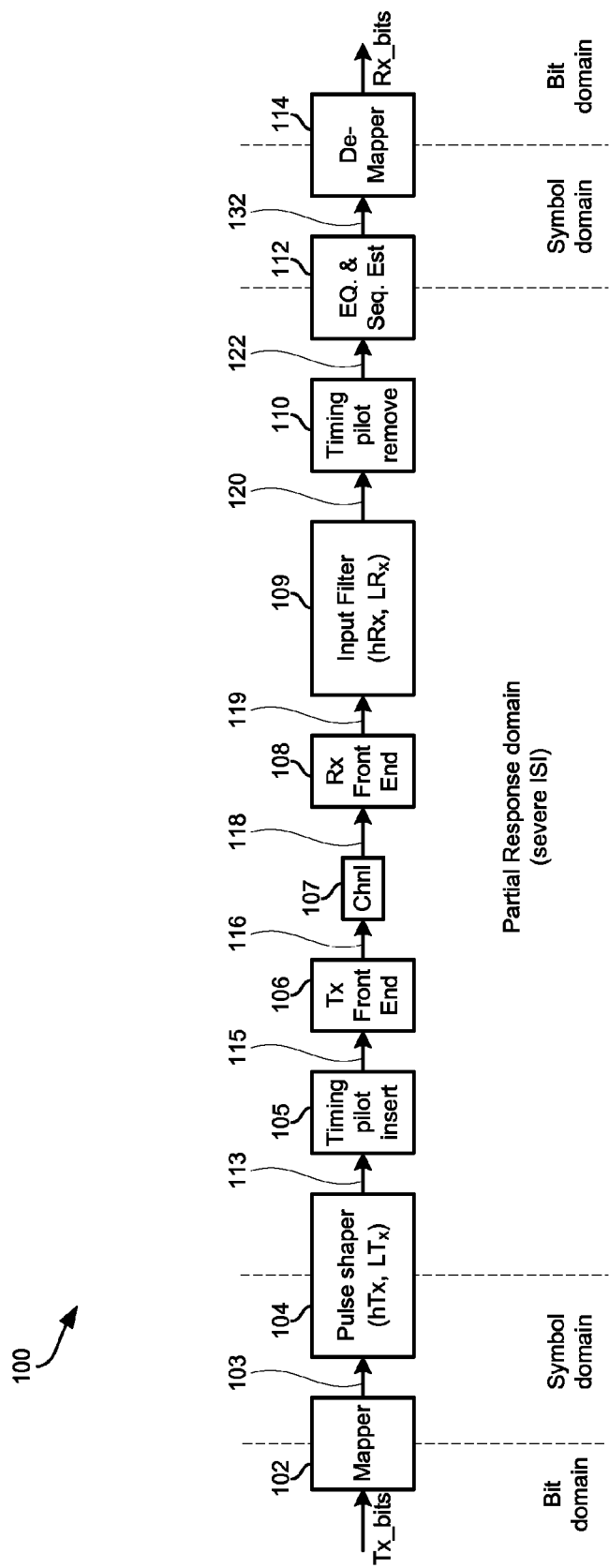
FIG. 1 is a block diagram depicting an example system configured for low-complexity, highly-spectrally-efficient communications.

FIG. 1 is a block diagram depicting an example system configured for low-complexity, highly-spectrally-efficient communications. The system 100 comprises a mapper circuit 102, a pulse shaping filter circuit 104, a timing pilot insertion circuit 105, a transmitter front-end circuit 106, a channel 107, a receiver front-end 108, a filter circuit 109, a timing pilot removal circuit 110, an equalization and sequence estimation circuit 112, and a de-mapping circuit 114. The components 102, 104, 105, and 106 may be part of a transmitter (e.g., a base station or access point, a router, a gateway, a mobile device, a server, a computer, a computer peripheral device, a table, a modem, a set-top box, etc.), the components 108, 109, 110, 112, and 114 may be part of a receiver (e.g., a base station or access point, a router, a gateway, a mobile device, a server, a computer, a computer peripheral device, a table, a modem, a set-top box, etc.), and the transmitter and receiver may communicate via the channel 107.

The mapper 102 may be operable to map bits of the Tx_bitstream to be transmitted to symbols according to a selected modulation scheme. The symbols may be output via signal 103. The Tx_bitstream may, for example, be the result of bits of data passing through a forward error correction (FEC) encoder and/or an interleaver. Additionally, or alternatively, the symbols out of the mapper 102 may pass through an interleaver. For example, for a quadrature amplitude modulation scheme having a symbol alphabet of N (N-QAM), the mapper may map each $\text{Log}_2(N)$ bits of the Tx_bitstream to single symbol represented as a complex number and/or as in-phase (I) and quadrature-phase (Q) components. Although N-QAM is used for illustration in this disclosure, aspects of this disclosure are applicable to any modulation scheme (e.g., amplitude shift keying (ASK), phase shift keying (PSK), frequency shift keying (FSK), etc.). In some implementations, the mapper 102 (and correspondingly, the de-mapper 114) may be configured to utilize optimized symbol constellations. For example, the symbol constellation used by the mapper may be optimized for best bit-error rate performance that is related to log-likelihood ratio (LLR) and to optimizing mean mutual information bit (MMIB). In some instances, the optimized symbol constellations may be configured in accordance with various aspects of the partial response based communication path. For example, the symbol constellations may be optimized based on applicable error patterns and/or optimization of minimum distance. The points of the symbol constellations used by the mapper 102 (and correspondingly the de-mapper 114) may be regularly spaced ("on-grid") or irregularly spaced ("off-grid"), such as due to constellation optimization. Examples of symbol constellation optimization, particularly based on partial response, are described with respect to at least some of the following figures (particularly, FIGS. 4-6).

The pulse shaper 104 may be operable to adjust the waveform of the signal 103 such that the waveform of the resulting signal 113 complies with the spectral requirements of the channel over which the signal 113 is to be transmitted. The spectral requirements may be referred to as the "spectral mask" and may be established by a regulatory body (e.g., the Federal Communications Commission in the United States or the European Telecommunications Standards Institute) and/or a standards body (e.g., Third Generation Partnership Project) that governs the communication channel(s) and/or standard(s) in use. The pulse shaper 104 may comprise, for example, an infinite impulse response (IIR) and/or a finite impulse response (FIR) filter. The number of taps, or "length," of the pulse shaper 104 is denoted herein as LTx, which is an integer. The impulse response of the pulse shaper 104 is denoted herein as hTx. The pulse shaper 104 may be configured such that its output signal 113 intentionally has a substantial amount of inter-symbol interference (ISI). Accordingly, the pulse shaper 104 may be referred to as a partial response pulse shaping filter, and the signal 113 may be referred to as a partial response signal or as residing in the partial response domain, whereas the signal 103 may be referred to as residing in the symbol domain. The number of taps and/or the values of the tap coefficients of the pulse shaper 104 may be designed such that the pulse shaper 104 is intentionally non-optimal for additive white Gaussian noise (AWGN) in order to improve tolerance of non-linearity in the signal path. In this regard, the pulse shaper 104 may offer superior performance in the presence of non-linearity as compared to, for example, a conventional zero (or near zero) positive ISI pulse shaping filter (e.g., root raised cosine (RRC) pulse shaping filter). The pulse shaper 104 may be designed as described in connection with at least some of the following figures (e.g., FIGS. 4-6), and in one or more of: the United States patent application titled "Design and Optimization of Partial Response Pulse Shape Filter," and the United States patent application titled "Dynamic Filter Adjustment for Highly Spectrally Efficient Communications," each of which is incorporated by reference herein, as set forth above.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near zero) ISI signals generated by, for example, raised-cosine (RC) or root-raised-cosine (RRC) filtering. For simplicity of illustration, this disclosure focuses on partial response signals generated via partial response filtering. Nevertheless, aspects of this disclosure are applicable to other ISC signals such as, for example, signals generated via matrix multiplication (e.g., lattice coding), and signals generated via decimation below the Nyquist frequency such that aliasing creates correlation between symbols.

The timing pilot insertion circuit 105 may insert a pilot signal which may be utilized by the receiver for timing synchronization. The output signal 115 of the timing pilot insertion circuit 105 may thus comprise the signal 113 plus an inserted pilot signal (e.g., a sine wave at ¼× fbaud, where fbaud is the symbol rate). An example implementation of the pilot insertion circuit 105 is described in the United States patent application titled "Timing Synchronization for Reception of Highly-Spectrally-Efficient Communications," which is incorporated herein by reference, as set forth above.

The transmitter front-end 106 may be operable to amplify and/or upconvert the signal 115 to generate the signal 116. Thus, the transmitter front-end 106 may comprise, for example, a power amplifier and/or a mixer. The front-end may introduce non-linear distortion and/or phase noise (and/or other non-idealities) to the signal 116. The non-linearity of the circuit 106 may be represented as FnlTx which may be, for example, a polynomial, or an exponential (e.g., Rapp model). The non-linearity may incorporate memory (e.g., Voltera series).

The channel 107 may comprise a wired, wireless, and/or optical communication medium. The signal 116 may propagate through the channel 107 and arrive at the receive front-end 108 as signal 118. Signal 118 may be noisier than signal 116 (e.g., as a result of thermal noise in the channel) and may have higher or different ISI than signal 116 (e.g., as a result of multi-path).

The receiver front-end 108 may be operable to amplify and/or downconvert the signal 118 to generate the signal 119. Thus, the receiver front-end may comprise, for example, a low-noise amplifier and/or a mixer. The receiver front-end may introduce non-linear distortion and/or phase noise to the signal 119. The non-linearity of the circuit 108 may be represented as FnlRx which may be, for example, a polynomial, or an exponential (e.g., Rapp model). The non-linearity may incorporate memory (e.g., Voltera series).

The timing pilot recovery and removal circuit 110 may be operable to lock to the timing pilot signal inserted by the pilot insertion circuit 105 in order to recover the symbol timing of the received signal. The output 122 may thus comprise the signal 120 minus (i.e. without) the timing pilot signal. An example implementation of the timing pilot recovery and removal circuit 110 is described in the United States patent application titled "Timing Synchronization for Reception of Highly-Spectrally-Efficient Communications," which is incorporated herein by reference, as set forth above.

The input filter 109 may be operable to adjust the waveform of the partial response signal 119 to generate partial response signal 120. The input filter 109 may comprise, for example, an infinite impulse response (IIR) and/or a finite impulse response (FIR) filter. The number of taps, or "length," of the input filter 109 is denoted herein as LRx, an integer. The impulse response of the input filter 109 is denoted herein as hRx. The number of taps, and/or tap coefficients of the input filter 109 may be configured based on: a non-linearity model, $\widehat{Fnl}$, signal-to-noise ratio (SNR) of signal 120, the number of taps and/or tap coefficients of the Tx partial response filter 104, and/or other parameters. The number of taps and/or the values of the tap coefficients of the input filter 109 may be configured such that noise rejection is intentionally compromised (relative to a perfect match filter) in order to improve performance in the presence of non-linearity. As a result, the input filter 109 may offer superior performance in the presence of non-linearity as compared to, for example, a conventional zero (or near zero) positive ISI matching filter (e.g., root raised cosine (RRC) matched filter). The input filter 109 may be designed as described in connection with at least some of the following figures (e.g., FIGS. 4-6), and in one or more of: the United States patent application titled "Design and Optimization of Partial Response Pulse Shape Filter," and the United States patent application titled "Dynamic Filter Adjustment for Highly Spectrally Efficient Communications," each of which is incorporated by reference herein, as set forth above.

As utilized herein, the "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the Tx pulse shaper 104 and/or the Rx input filter 109 are below a determined level. Reducing L may reduce decoding complexity of the sequence estimation. This tradeoff may be optimized during the design of the system 100.

The equalizer and sequence estimator 112 may be operable to perform an equalization process and a sequence estimation process. Details of an example implementation of the equalizer and sequence estimator 112 are described below with respect to FIG. 2. The output signal 132 of the equalizer and sequence estimator 112 may be in the symbol domain and may carry estimated values of corresponding transmitted symbols (and/or estimated values of the corresponding transmitted information bits of the Tx_bitstream) of signal 103. Although not depicted, the signal 132 may pass through an interleaver en route to the de-mapper 114. The estimated values may comprise soft-decision estimates, hard-decision estimates, or both.

The de-mapper 114 may be operable to map symbols to bit sequences according to a selected modulation scheme. For example, for an N-QAM modulation scheme, the mapper may map each symbol to $Log_2(N)$ bits of the Rx_bitstream. The Rx_bitstream may, for example, be output to a de-interleaver and/or an FEC decoder. Alternatively, or additionally, the de-mapper 114 may generate a soft output for each bit, referred as LLR (Log-Likelihood Ratio). The soft output bits may be used by a soft-decoding forward error corrector (e.g. a low-density parity check (LDPC) decoder). The soft output bits may be generated using, for example, a Soft Output Viterbi Algorithm (SOVA) or similar. Such algorithms may use additional information of the sequence decoding process including metrics levels of dropped paths and/or estimated bit probabilities for generating the LLR, where $$LLR(b) = \log\left(\frac{P_b}{1-P_b}\right),$$

where $P_b$ is the probability that bit b=1.

In an example implementation, components of the system upstream of the pulse shaper 104 in the transmitter and downstream of the equalizer and sequence estimator 112 in the receiver may be as found in a conventional N-QAM system. Thus, through modification of the transmit side physical layer and the receive side physical layer, aspects of the invention may be implemented in an otherwise conventional N-QAM system in order to improve performance of the system in the presence of non-linearity as compared, for example, to use of RRC filters and an N-QAM slicer.

Figure 2:
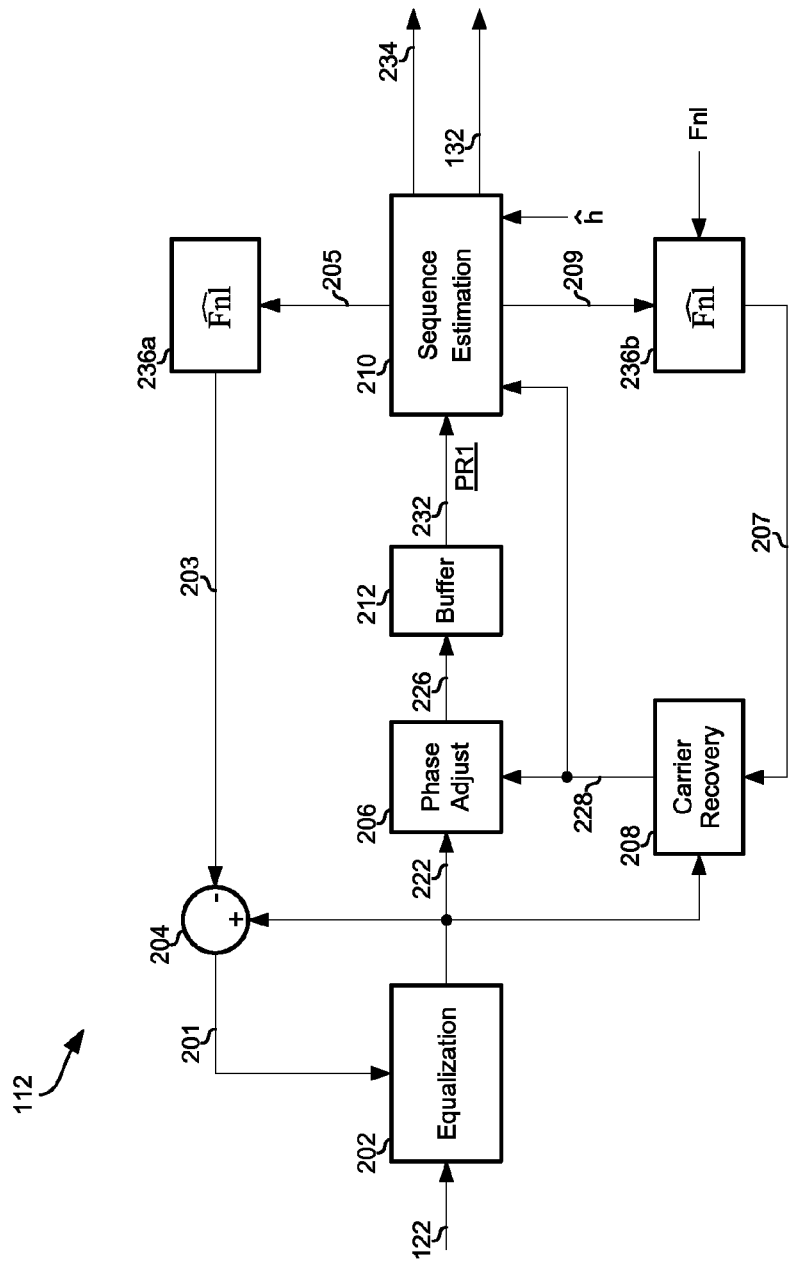
FIG. 2 is a block diagram depicting an example equalization and sequence estimation circuit for use in a system configured for low-complexity, highly-spectrally-efficient communications.

FIG. 2 is a block diagram depicting an example equalization and sequence estimation circuit for use in a system configured for low-complexity, highly-spectrally-efficient communications. Shown are an equalizer circuit 202, a signal combiner circuit 204, a phase adjust circuit 206, a sequence estimation circuit 210, and non-linearity modeling circuits 236a and 236b.

The equalizer 202 may be operable to process the signal 122 to reduce ISI caused by the channel 107. The output 222 of the equalizer 202 is a partial response domain signal. The ISI of the signal 222 is primarily the result of the pulse shaper 104 and the input filter 109 (there may be some residual ISI from multipath, for example, due to use of the least means square (LMS) approach in the equalizer 202). The error signal, 201, fed back to the equalizer 202 is also in the partial response domain. The signal 201 is the difference, calculated by combiner 204, between 222 and a partial response signal 203 that is output by non-linearity modeling circuit 236a. An example implementation of the equalizer is described in the United States patent application titled "Feed Forward Equalization for Highly-Spectrally-Efficient Communications," which is incorporated herein by reference, as set forth above.

The carrier recovery circuit 208 may be operable to generate a signal 228 based on a phase difference between the signal 222 and a partial response signal 207 output by the non-linearity modeling circuit 236b. The carrier recovery circuit 208 may be as described in the United States patent application titled "Coarse Phase Estimation for Highly-Spectrally-Efficient Communications," which is incorporated herein by reference, as set forth above.

The phase adjust circuit 206 may be operable to adjust the phase of the signal 222 to generate the signal 226. The amount and direction of the phase adjustment may be determined by the signal 228 output by the carrier recovery circuit 208. The signal 226 is a partial response signal that approximates (up to an equalization error caused by finite length of the equalizer 202, a residual phase error not corrected by the phase adjust circuit 206, non-linearities, and/or other non-idealities) the total partial response signal resulting from corresponding symbols of signal 103 passing through pulse shaper 104 and input filter 109.

The buffer 212 buffers samples of the signal 226 and outputs a plurality of samples of the signal 226 via signal 232. The signal 232 is denoted PR1, where the underlining indicates that it is a vector (in this case each element of the vector corresponds to a sample of a partial response signal). In an example implementation, the length of the vector PR1 may be Q samples.

Input to the sequence estimation circuit 210 are the signal 232, the signal 228, and a response $\hat{h}$. Response $\hat{h}$ is based on h (the total partial response, discussed above). For example, response $\hat{h}$ may represent a compromise between h (described above) and a filter response that compensates for channel non-idealities such as multi-path. The response $\hat{h}$ may be conveyed and/or stored in the form of LTx+LRx−1 tap coefficients resulting from convolution of the LTx tap coefficients of the pulse shaper 104 and the LRx tap coefficients of the input filter 109. Alternatively, response $\hat{h}$ may be conveyed and/or stored in the form of fewer than LTx+LRx−1 tap coefficients—for example, where one or more taps of the LTx and LRx is ignored due to being below a determined threshold. The sequence estimation circuit 210 may output partial response feedback signals 205 and 209, a signal 234 that corresponds to the finely determined phase error of the signal 120, and signal 132 (which carries hard and/or soft estimates of transmitted symbols and/or transmitted bits). An example implementation of the sequence estimation circuit 210 is described below with reference to FIG. 3.

The non-linear modeling circuit 236a may apply a non-linearity function $\widehat{Fnl}$ (a model of the non-linearity seen by the received signal en route to the circuit 210) to the signal 205 resulting in the signal 203. Similarly, the non-linear modeling circuit 236b may apply the non-linearity function $\widehat{Fnl}$ to the signal 209 resulting in the signal 207.

$\widehat{Fnl}$ may be, for example, a third-order or fifth-order polynomial. Increased accuracy resulting from the use of a higher-order polynomial for $\widehat{Fnl}$ may tradeoff with increased complexity of implementing a higher-order polynomial. Where FnlTx is the dominant non-linearity of the communication system 100, $\widehat{Fnl}$ modeling only FnlTx may be sufficient. Where degradation in receiver performance is above a threshold due to other non-linearities in the system (e.g., non-linearity of the receiver front-end 108) the model $\widehat{Fnl}$ may take into account such other non-linearities.

Figure 3:
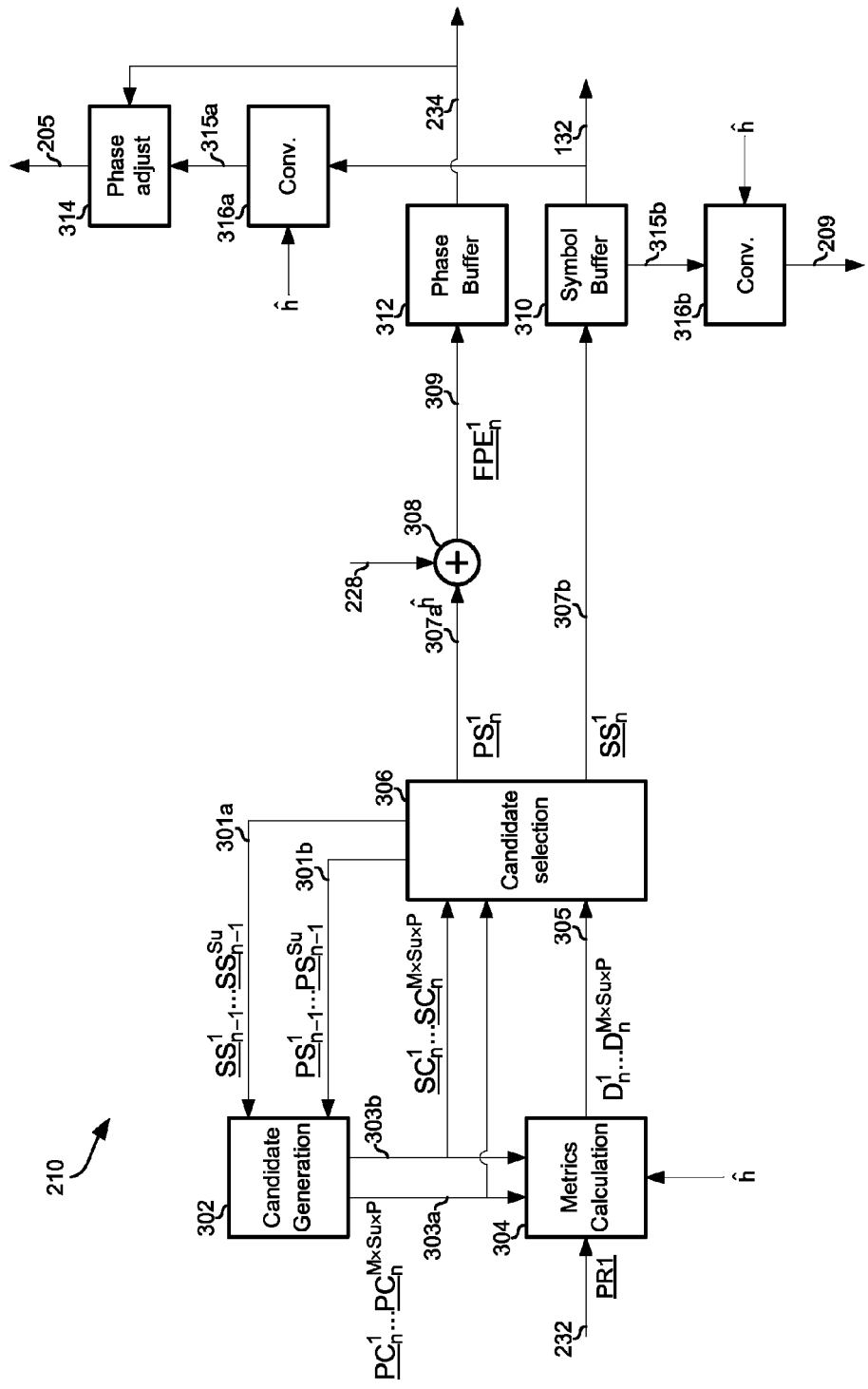
FIG. 3 is a block diagram depicting an example sequence estimation circuit for use in a system configured for low-complexity, highly-spectrally-efficient communications.

FIG. 3 is a block diagram depicting an example sequence estimation circuit for use in a system configured for low-complexity, highly-spectrally-efficient communications. Shown are a candidate generation circuit 302, a metrics calculation circuit 304, a candidate selection circuit 306, a combiner circuit 308, a buffer circuit 310, a buffer circuit 312, a phase adjust circuit 314, and convolution circuits 316a and 316b. The sequence estimation process described with respect to FIG. 3 is an example only. Many variations of the sequence estimation process are also possible. For example, although the implementation described here uses one phase survivor per symbol survivor, another implementation may have PSu (e.g., PSu <Su) phase survivors that will be used commonly for each symbol survivor.

For each symbol candidate at time n, the metrics calculation circuit 304 may be operable to generate a metric vector $$D_n^1 \ldots D_n^{M \times Su \times P}$$

based on the partial response signal PR1, the signal 303a conveying the phase candidate vectors $$\underline{PC}_n^1 \ldots \underline{PC}_n^{M \times Su \times P},$$

and the signal 303b conveying the symbol candidate vectors $$\underline{SC}_n^1 \ldots \underline{SC}_n^{M \times Su \times P},$$

where underlining indicates a vector, subscript n indicates that it is the candidate vectors for time n, M is an integer equal to the size of the symbol alphabet (e.g., for N-QAM, M is equal to N), Su is an integer equal to the number of symbol survivor vectors retained for each iteration of the sequence estimation process, and P is an integer equal to the size of the phase alphabet. In an example implementation, the size of phase alphabet is three, with each of the three symbols corresponding to one of: a positive shift, a negative phase shift, or zero phase shift, as further described in the United States patent application titled "Low-Complexity, Highly-Spectrally-Efficient Communications," and in the United States patent application titled "Fine Phase Estimation for Highly Spectrally Efficient Communications," each of which is incorporated herein by reference, as set forth above. In an example implementation, each phase candidate vector may comprise Q phase values and each symbol candidate vector may comprise Q symbols. An example implementation of the metrics calculation block is described in the United States patent application titled "Low-Complexity, Highly-Spectrally-Efficient Communications," which is incorporated herein by reference, as set forth above.

The candidate selection circuit 306 may be operable to select Su of the symbol candidates $$\underline{SC}_n^1 \ldots \underline{SC}_n^{M \times Su \times P}$$

are Su of the phase candidates $$\underline{PC}_n^1 \ldots \underline{PC}_n^{M \times Su \times P}$$

based on the metrics $$D_n^1 \ldots D_n^{M \times Su \times P}.$$

The selected phase candidates are referred to as the phase survivors $$\underline{PS}_n^1 \ldots \underline{PS}_n^{Su}.$$

Each element of each phase survivors $$\underline{PS}_n^1 \ldots \underline{PS}_n^{Su}$$

may correspond to an estimate of residual phase error in the signal 232. That is, the phase error remaining in the signal after coarse phase error correction via the phase adjust circuit 206. The best phase survivor $$\underline{PS}_n^1$$

is conveyed via signal 307a. The Su phase survivors are retained for the next iteration of the sequence estimation process (at which time they are conveyed via signal 301b). The selected symbol candidates are referred to as the symbol survivors $$\underline{SS}_n^1 \ldots \underline{SS}_n^{Su}.$$

Each element of each symbol survivors $$\underline{SS}_n^1 \ldots \underline{SS}_n^{Su}$$

may comprise a soft-decision estimate and/or a hard-decision estimate of a symbol and/or information bits of the signal 232. The best symbol survivor $SS_n^1$ is conveyed to symbol buffer 310 via the signal 307b. The Su symbol survivors are retained for the next iteration of the sequence estimation process (at which time they are conveyed via signal 301a). Although, the example implementation described selects the same number, Su, of phase survivors and symbol survivors, such is not necessarily the case. Operation of example candidate selection circuits 306 are described in the United States patent application titled "Low-Complexity, Highly-Spectrally-Efficient Communications," which is incorporated herein by reference, as set forth above.

The candidate generation circuit 302 may be operable to generate phase candidates $$\underline{PC}_n^1 \ldots \underline{PC}_n^{M \times Su \times P}$$

and symbol candidates $$\underline{SC}_n^1 \ldots \underline{SC}_n^{M \times Su \times P}$$

from phase survivors $$\underline{PS}_{n-1}^1 \ldots \underline{PS}_{n-1}^{Su}$$

and symbol survivors $$\underline{SS}_{n-1}^1 \ldots \underline{SS}_{n-1}^{Su},$$

wherein the index n−1 indicates that they are survivors from time n−1 are used for generating the candidates for time n. In an example implementation, generation of the phase and/or symbol candidates may be as, for example, described in one or more of: the United States patent application titled "Low-Complexity, Highly-Spectrally-Efficient Communications," and the United States patent application titled "Joint Sequence Estimation of Symbol and Phase with High Tolerance of Nonlinearity," each of which is incorporated herein by reference, as set forth above.

The symbol buffer circuit 310 may comprise a plurality of memory elements operable to store one or more symbol survivor elements of one or more symbol survivor vectors. The phase buffer circuit 312 may comprise a plurality of memory elements operable to store one or more phase survivor vectors. Example implementations of the buffers 310 and 312 are described in the United States patent application titled "Low-Complexity, Highly-Spectrally-Efficient Communications," which is incorporated herein by reference, as set forth above.

The combiner circuit 308 may be operable to combine the best phase survivor $$\underline{PS}_n^1,$$

conveyed via signal 307a, with the signal 228 generated by the carrier recovery circuit 208 (FIG. 2) to generate fine phase error vector $$\underline{FPE}_n^1,$$

conveyed via signal 309, which corresponds to the finely estimated phase error of the signal 222 (FIG. 2). At each time n, fine phase error vector stored in phase buffer 312 may be overwritten by $FPE_{n-1}^{1}$ $FPE_{n}^{1}$.

The phase adjust circuit 314 may be operable to adjust the phase of the signal 315a by an amount determined by the signal 234 output by phase buffer 312, to generate the signal 205.

The circuit 316a, which performs a convolution, may comprise a FIR filter or IIR filter, for example. The circuit 316a may be operable to convolve the signal 132 with response $\hat{h}$, resulting in the partial response signal 315a. Similarly, the convolution circuit 316b may be operable to convolve the signal 317 with response $\hat{h}$, resulting in the partial response signal 209. As noted above, response $\hat{h}$ may be stored by, and/or conveyed to, the sequence estimation circuit 210 in the form of one or more tap coefficients, which may be determined based on the tap coefficients of the pulse shaper 104 and/or input filter 109 and/or based on an adaptation algorithm of a decision feedback equalizer (DFE). Response $\hat{h}$ may thus represent a compromise between attempting to perfectly reconstruct the total partial response signal (103 as modified by pulse shaper 104 and input filter 109) on the one hand, and compensating for multipath and/or other non-idealities of the channel 107 on the other hand. In this regard, the system 100 may comprise one or more DFEs as described in one or more of: the United States patent application titled "Decision Feedback Equalizer for Highly-Spectrally-Efficient Communications," the United States patent application titled "Decision Feedback Equalizer with Multiple Cores for Highly-Spectrally-Efficient Communications," and the United States patent application titled "Decision Feedback Equalizer Utilizing Symbol Error Rate Biased Adaptation Function for Highly-Spectrally-Efficient Communications," each of which is incorporated herein by reference, as set forth above.

Thus, signal 203 is generated by taking a first estimate of transmitted symbols, (an element of symbol survivor $SS_{n}^{1}SS_{n}^{1}$), converting the first estimate of transmitted symbols to the partial response domain via circuit 316a, and then compensating for non-linearity in the communication system 100 via circuit 236a (FIG. 2). Similarly, signal 207 is generated from a second estimate of transmitted symbols (an element of symbol survivor $SS_{n}^{1}$)

that is converted to the partial response domain by circuit 316b to generate signal 209, and then applying a non-linear model to the signal 209b to compensate for non-linearity in the signal path.

Figure 4:
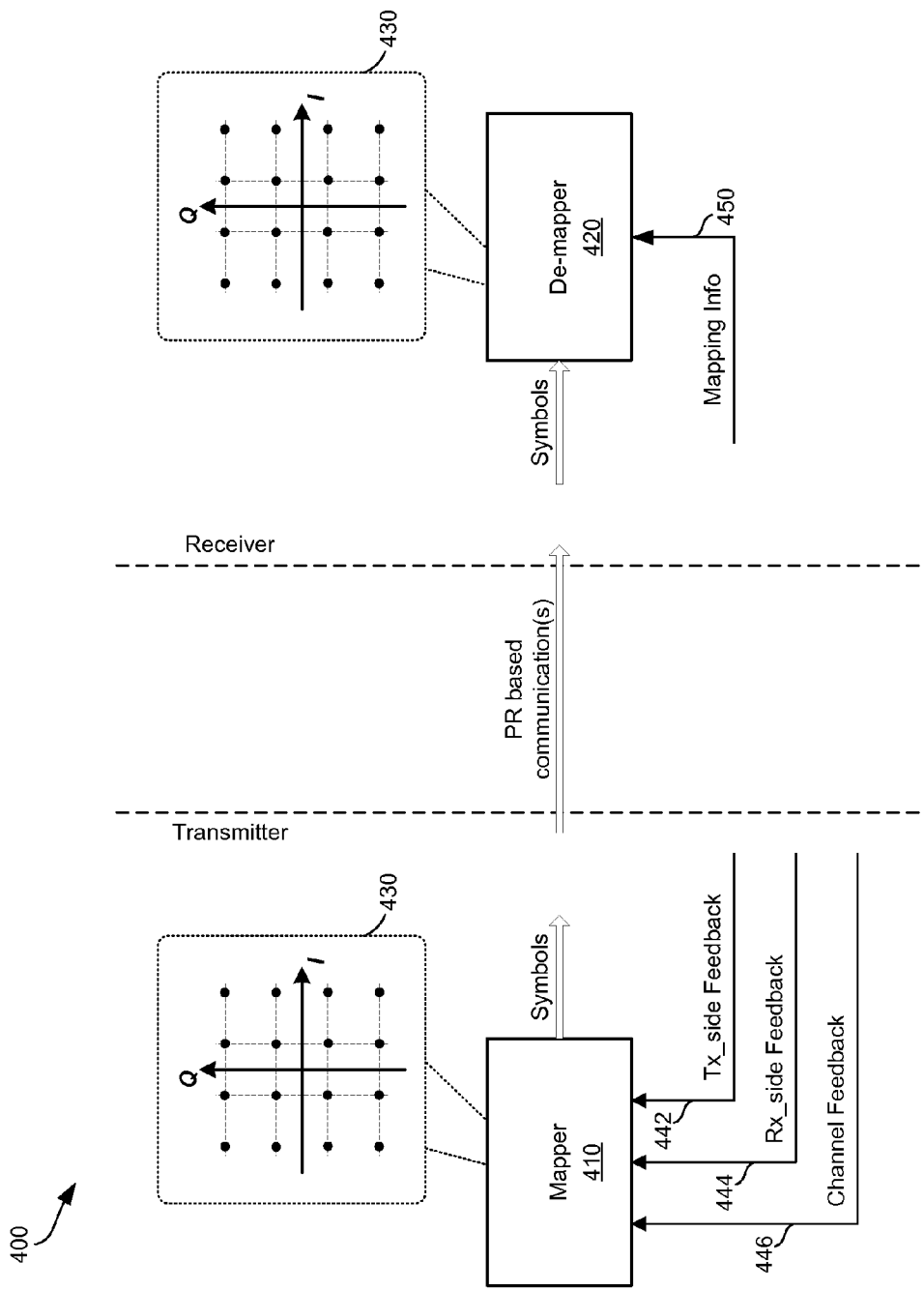
FIG. 4 is a block diagram depicting an example symbol mapping/de-mapping setup for use in a system configured for low-complexity, highly-spectrally-efficient communications.

FIG. 4 is a block diagram depicting an example symbol mapping/de-mapping setup for use in a system configured for low-complexity, highly-spectrally-efficient communications. Referring to FIG. 4, there is shown a symbol mapping/de-mapping system 400, which may comprise a mapper 410 and a de-mapper 430.

Each of the mapper 410 and the de-mapper 420 may comprise suitable circuitry, interfaces, logic, and/or code for performing mapping and de-mapping (respectively) between data bits and symbols, such as during communication of data between a transmitter and a receiver which may comprise the mapper 410 and the de-mapper 420, respectively (i.e. that is, performing data bits-to-symbols mapping by the mapper 410 in the transmitter, and corresponding symbol-to-data bits mapping by the de-mapper 420 in the receiver). The mapper 410 and the de-mapper 420 may correspond to the mapper 102 and the de-mapper 112, respectively, of FIG. 1.

In operation, the mapper 410 and de-mapper 420 may be utilized in a communication setup (e.g. comprising the transmitter and the receiver) to provide the symbol mapping/de-mapping, particularly in accordance with a modulation scheme that is applied to the communication between the transmitter and receiver. In this regard, modulation schemes may comprise use and communication of symbols rather than actual bits as means of improving performance. For example, because each communicated symbol may represent a plurality (e.g., an integer greater than one number of bits), overall throughput may be enhanced because, for example, communication of symbols may require less bandwidth compared to the actual bits represented by the symbols.

In some instances, the mapper 410 (and correspondingly the de-mapper 420) may utilize a symbol constellation 430 (e.g., stored in the form of a look-up table) in conjunction with the symbol mapping/de-mapping operations performed thereby. In this regard, a symbol constellation may comprise a plurality of constellation points, placed at ideal positions along one or more dimensions, for use during symbol mapping/de-mapping in conjunction with one or more modulation schemes. Symbol constellations are often (e.g., for QAM-based modulation schemes) two-dimensional and comprise a plurality of points in the complex (i.e. "I-Q") plane. In other words, a symbol constellation may comprise constellation points in the complex plane that correspond to all possible symbols that may be selected by a given modulation scheme. A particular symbol constellation (or specifically the distribution of the constellation points and/or separation therebetween in the diagram) may be configured for a particular system based on a variety of considerations such as types of interference and/or distortion that is experienced by communicated signals.

For example, in quadrature modulation schemes (e.g., quadrature amplitude modulation or QAM, phase-shift keying or PSK, minimum-shift keying or MSK, etc.), transmitted symbols may be represented as complex values, and modulated using two different carrier signals (e.g., cosine and sine carrier signals) corresponding to the real and imaginary parts, respectively, with the two different carrier signals being configured to allow communication of the two parts of the transmitted symbols on the same frequency using the two carriers. The carriers used in this manner are typically referred to as quadrature carriers. At the receiver, coherent detection may be utilized to independently demodulate these quadrature carriers. Accordingly, because the symbols are represented as complex values, they can be represented as points positioned in the complex plane in a symbol constellation diagram, such as the diagrams drawn in FIG. 4. For example, in a N-QAM modulation scheme (N being an integer multiple of 2), a symbol constellation comprising N constellation points (corresponding to N symbols) is used, with each of the constellation points corresponding to a unique $\text{Log}_2(N)$ bit-pattern. Thus, in a 16-QAM for example, the constellation diagram may comprise 16 constellation points, with each constellation point corresponding to a unique 4-bit pattern—e.g., each of the 16 constellation points may be associated with one of the 16 bit patterns (0, 0, 0, 0) to (1, 1, 1, 1).

At the receiver, upon reception of the signal, during demodulation of the received signals, symbols carried therein may be extracted and processed to determine the bits sequences represented thereby. In some instances, processing symbols may entail examining the received signal to determine if it has been corrupted—e.g., by the transmitter, the channel(s), and/or the receiver (e.g. additive white Gaussian noise, non-linear distortion, phase noise or interference). Accordingly, decoding operations in the receiver may entail an estimation process to determine the symbols of the received signal. In this regard, the receiver may select, as its estimate of a transmitted symbol, that point of the symbol constellation which is closest, or most-likely corresponds, to the value of a corresponding sample of the received signal. In some systems, maximum likelihood based symbol slicing may be utilized during de-mapping operations. In this regard, the maximum likelihood based estimations may simply be made in a Euclidean distance sense (i.e. two dimensionally), thus resulting in demodulation errors if any corruption affecting the symbols causes a received symbol to move closer to a constellation point this is different from the actual constellation point used during mapping at the transmit-side.

In some instances, the mapping/de-mapping system 400 may be utilized in conjunction with partial response (PR) based communications. In this regard, one distinction between a partial response (PR) based scheme in accordance with the present disclosure and existing/legacy schemes pertains to inter-symbol interference (ISI). Inter-symbol interference (ISI) is typically undesired, and existing/legacy schemes are typically tailored to eliminate or significantly minimize ISI (e.g., either being configured to achieve zero ISI or near-zero ISI, or when allowing for ISI it would be minimal amount, typically based on specified acceptable error rates). Achieving such zero (or near-zero) ISI usually comes at the expense of the baud rate (or the bandwidth efficiency)—e.g., being significantly worse than the channel's Shannon capacity bound.

For example, most existing filtering implementations, particularly Root Raised Cosine (RRC) and/or Raised Cosine (RC) based implementations, are typically configured to have zero (or near-zero) ISI, to assure demodulating performance. In partial response (PR) based communications as implemented in accordance with aspects of the present disclosure, however, end-to-end communication path may be configured such that signals communicated between the transmitter and the receiver would intentionally incorporate substantial amount of inter-symbol interference (ISI). In this regard, allowing for substantial amount of ISI may allow for increasing the symbol rate (and/or reducing required bandwidth), which may allow, when drawbacks of having substantial ISI are mitigated (e.g., through signal processing techniques in the receiver) for enhanced performance. In other words, use of partial response pulse shaping may allow for generating signals with particular inherent and substantial amount of ISI such that to enable compressing the signal spectrum to allow improved spectral efficiency. Therefore, to achieve the desired performance enhancements when using partial response pulse shaping, various aspects of operations and/or functions that may be required for providing end-to-end communicability may be configured and/or adjusted to account for the partial response (and particularly, for the presence of substantial ISI).

The design and configuration of pulse shaping (particularly filters/filtering used thereof) in PR based communications may be based on optimization processes, which may be configured to achieve and/or balance between several objectives. Such optimization processes (e.g., filters/filtering optimization processes) may be subject to implementation-specific performance-related parameters, variables, constraints, and/or cost functions, which may be defined for particular desired optimization. In this regard, the one or more performance-related parameters may pertain to the filtering itself and/or other aspects of the communication that may be affected by it (e.g., error measurements). The constraints may comprise particular limits or requirements, which may apply to, for example, the performance-related variables and/or the filters (or their configuration). For example, spectral mask limits and/or compliance therewith may be constraint in any filtering configuration or optimization thereof. The cost functions may be defined over one or more performance-related parameters or variables—e.g., specifying the filter configuration (for example, filter tap coefficient values) is to be optimized based on a function of one or more variables. The cost functions may, in some instances, specify different weights to pertinent parameters or variables. The implementation-specific parameters, variables, constraints and/or cost functions may be defined by system designers or operators, such as via user input. Thus, the filter optimization process may provide optimal filtering configuration that may achieve the primary objective(s), as applied to the cost functions to meet (as much as possible) the specified performance-related parameters or variables, while complying with the specified constraints. An example of the use of filter optimization processes for the design and configuration of filters/filtering for partial response pulse shaping, and for allowing dynamic adjustments thereof, are described in more detail in one or more of: the United States patent application titled "Design and Optimization of Partial Response Pulse Shape Filter," and the United States patent application titled "Dynamic Filter Adjustment for Highly Spectrally Efficient Communications," each of which is incorporated by reference herein, as set forth above.

In addition, the partial response communication system may be configured such that effects of the substantial ISI may be mitigated and/or accounted for based on use of a specifically configured estimation process, as described, for example, in the United States patent application titled "Low-Complexity, Highly-Spectrally-Efficient Communications." In this regard, rather than utilize maximum likelihood (ML) based symbol slicing, the sequence estimation processing performed at the receiver in PR based implementations may entail use of a suboptimal, cost effective search (e.g., based on the Viterbi algorithm), denoted as high probability sequence estimation (HPSE). One characteristic of HPSE is that it is configured to handle sequences of symbols rather than on individual symbols.

Thus, partial response based pulse shaping may be associated with minimum distance reduction, which may be caused by the inherent substantial ISI and the fact that every sample handled at the receiver is a linear combination of many symbols. In this regard, the 'degradation' associated with the partial response pulse shaping may be compared to legacy pulse shaping (e.g., RRC based shaping) with zero or non-zero ISI, and this degradation may be a theoretical bound for maximum likelihood estimation and it should be perceived as the penalty for spectrum compression. In partial response based schemes, detection may associate with error bursts which have typical patterns. In this regard, error patterns may comprise combination of values representing presence or degree of error—e.g., when a sequence has no errors the error pattern may be represented by 0, whereas in case of an error event the error pattern may be represented by nonzero. Thus, every symbol constellation may have its worst case error pattern that may correspond to the minimum distance. In this regard, the error patterns may be determined based on the underlying base modulation scheme, including its symbol constellation. For example, higher-order symbol constellations (e.g., 128-QAM) may typically associate with smaller minimum distance then lower-order symbol constellations (e.g., QPSK) since higher-order symbol constellations may have much more combinations of errors patterns than lower-order symbol constellations would have. For example worst case pattern error of a QPSK symbol constellation may be [1 −1] and for 16-QAM constellation may be [1 −2 2 −1], where a '1' in the error pattern vector may reflect the normalized distance to an adjacent symbol. Thus, the error patterns in partial response based implementations may typically be multi-dimensional (i.e. vectors). In this regard, systems using slicing where decoding is done on individual symbols and detection/decoding errors are two-dimensional, the minimum distance may simply correspond to the shortest distance between two constellation points. In the partial response based implementations, however, the minimum distance may be associated with sequences—e.g., finding a sequence other than the original one for which the Euclidean distance is minimum. In this regard, each error vector may be associated with a distance. Furthermore, in partial response based communications where there may be several error events, each error event may provide additional small distance which is close to the minimum distance. Therefore, total error performance may be based, at least in part, on the summation of the error vectors contribution.

Accordingly, whereas legacy/existing based implementations may require use of regular constellation diagrams, the multi-dimensionality of error patterns may allow for use of irregular constellation diagrams since the focus is on the minimum distance of the whole sequence rather than minimum distance between adjacent points. Therefore, while in some instances, partial response based implementations may simply incorporate use of standard (e.g., "on-grid") symbol constellation, in various implementations, symbol constellation used in partial response based setups for symbol mapping/de-mapping may be adjusted (i.e. optimized), such as to further enhance the performance—e.g., reducing the minimum distance, which may be handled and/or accounted for by, for example, configuring one or more components of a transmitter or receiver for a more optimal estimation. For example, because in partial response based implementations errors are multidimensional (since samples are linear combination of symbols) rather than being only two-dimensional as they are in typical legacy systems (e.g., QAM based systems), adjustments may be applied to standard constellation diagram such that locations of and/or distances between constellation point may be optimal even if not uniform (i.e. "off-grid" such that the distance between a first point and its nearest neighbor may differ from the distance between a second point and its nearest neighbor). Thus, the constellation diagrams may be optimized by determining and applying constellation adjustments based on determined error detection in a receiver. The optimization of symbol mapping (e.g., optimization of a symbol constellation in use) may be considered as signal shaping that is used to approach Shannon's capacity limit. An example of constellation diagram adjustment for use in PR based systems is described in more detail in FIG. 5.

In some embodiments, configuring and/or adjusting symbol mapping (e.g., adjusting a symbol constellation in use) in partial response based communications may be based on observation and/or feedback. For example, the mapper 410 may be configured to receive or obtain transmit-side (Tx_side) feedback 442, receive-side (Rx_side) feedback 444, and/or channel feedback 446. In this regard, the Tx_side feedback 442 may comprise information relating to the transmitter (and/or functions or components thereof), particularly communication-related data (e.g., settings, parameters, or measurements) and/or data relating to resources availability or utilization. The Tx_side feedback 442 may comprise, for example, data reporting and/or relating to applicable spectral masks, backoff settings of a power amplifier in the transmitter, a clock frequency in the transmitter, or local oscillator frequency in the transmitter, a mode of operation (e.g., "high performance" or "power save") of the transmitter, a modulation type being used, a modulation order being used, frequency being used for timing pilot, temperature, etc. The Rx_side feedback 444 may comprise, for example, information relating to the receiver (and/or functions or components thereof), particularly communication related data (e.g., settings, parameters, or measurements), and/or data relating to resources availability or utilization. For example, the Rx_side feedback 444 may comprise data reporting and/or relating to LNA configuration, clock/LO frequencies, values of sequence estimation parameters (e.g., parameters P, PSu, Su, Q, q1, q2, q3 as described in the United States patent application titled "Low-Complexity, Highly-Spectrally-Efficient Communications"), temperature, and/or measured performance indicators (SNR, SER, BER, etc.) and/or channel response estimation including multipath. The channel feedback 446 may comprise information relating to interfaces(s) available between the transmit-side and the receive-side and/or channels on which communication may (or are) being carried. For example, the channel feedback 446 may comprise data relating to noise levels, adjacent channel interferers, and the like.

The mapper 410 may analyze the feedback, and may determine based on that analysis whether (re)configuration of and/or adjustments to current symbol mapping (e.g., symbol constellation adjustments) may be needed and/or feasible. For example, the mapper 410 may determine that position of and/or distances between the constellation points in the constellation diagram 430 used for symbol mapping/de-mapping may be adjusted, to enable enhancing overall performance, such as based on a particular set of conditions (or changes thereto), as indicated by the feedback data (i.e. the Tx_side feedback 442, the Rx_side feedback 444, and/or the channel feedback 446), for a particular objective (e.g., achieving optimal minimum distance reduction, error performance reduction, etc.)

In an example embodiment, adjustments may be bi-directional—that is, in addition to adjusting or modifying the mapper 410 and/or de-mapper 420 in response to configuration and/or operation of other components and/or functions in the overall PR path, configuration and/or operations of other components and/or functions in the overall PR path may be adjusted and/or modified in response to configuration and/or operations of the mapper 410 and/or the de-mapper 420. For example, in response to a modification of the symbol constellation 430, the Tx_side feedback 442 may be adjusted to indicate to other components in the transmitter that symbol mapping has been modified, and/or the Rx_side feedback 444 may be modified to provide the receiver with the new symbol constellation 430 to be used therein in conjunction with symbol de-mapping.

In an example embodiment, symbol mapping/de-mapping may be adapted to provide dynamic and/or real-time (or near real-time) adjustments, such as based on particular transmitter, receiver, and/or channel conditions and/or any variations thereof. In this regard, symbol mapping/de-mapping may be adapted and/or modified in real-time or near real-time (e.g., in response to signals recently and/or currently being communicated). For example, a symbol constellation (e.g., constellation 430) used for mapping and/or de-mapping may be configured and/or adjusted during run-time of the transmitter and/or receiver (e.g., in or near real-time) based on, for example, recently received signals and/or signals currently being received.

Figure 5:
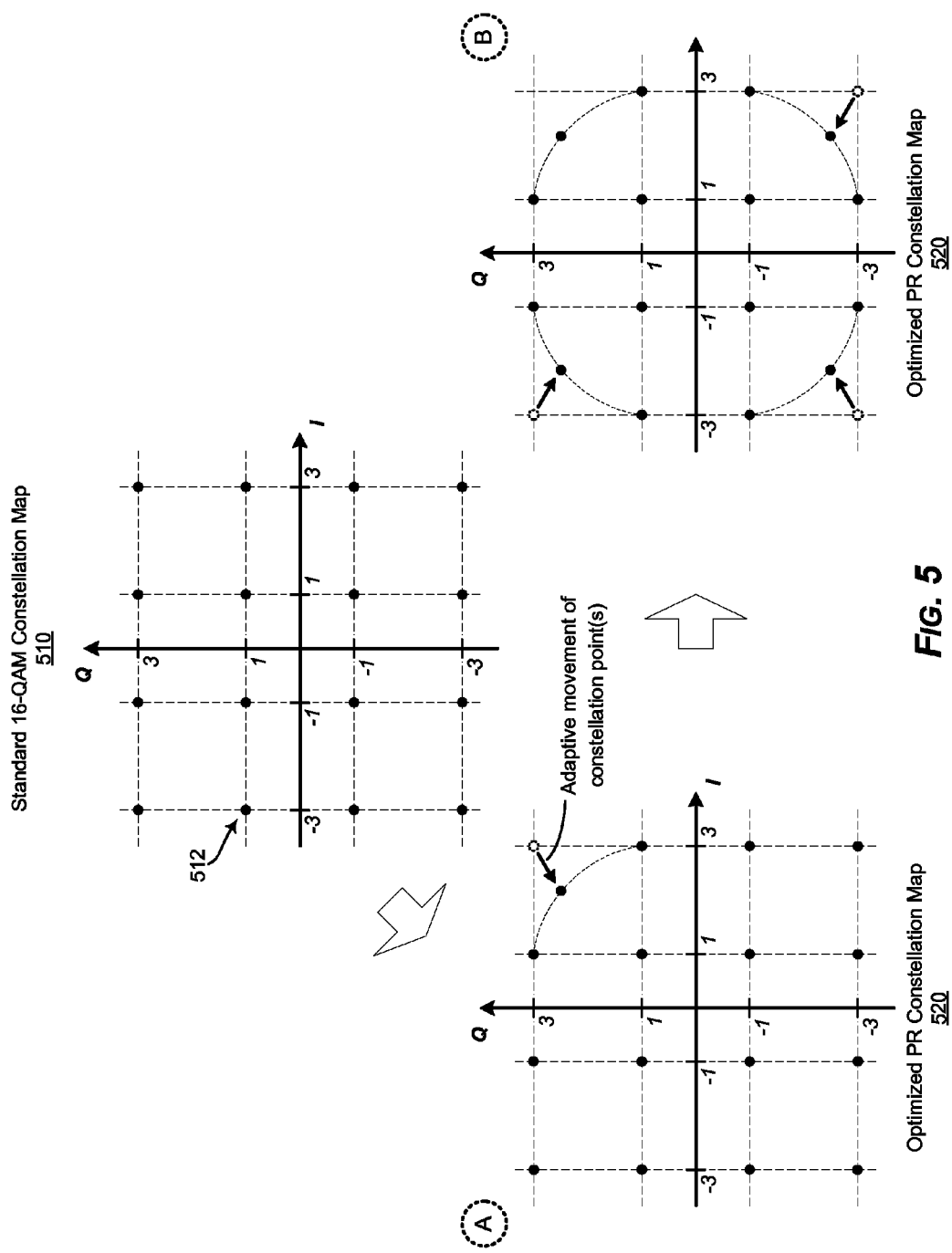
FIG. 5 is a chart depicting an example of a constellation symbol mapping optimization, in accordance with an embodiment of the present invention.

FIG. 5 is a chart depicting an example of a constellation symbol mapping optimization, in accordance with an embodiment of the present invention. Referring to FIG. 5, there are shown two constellation diagrams 510 and 520.

Each of the constellation diagrams 510 and 520 may comprise a two-dimensional symbol constellation, which may be used during signal modulation/demodulation in accordance with a particular modulation scheme. In this regard, the constellation diagram 510 may represent a symbol constellation that may be used by a standard scheme, such as a quadrature amplitude modulation (QAM). For example, as shown in FIG. 5, the constellation diagram 510 may correspond to a 16-QAM scheme. In this regard, in standard QAM constellation diagrams, constellation points (corresponding to valid symbols) may be at positions on a regular two-dimensional grid (i.e. "on-grid"), with the constellation points being placed at positions ±(2n+1) in the I-Q plane, where n is positive integer. The constellation diagram 510 may comprise 16 constellation points in the I-Q plane (a complex plane defined by the in-phase axis or I-axis and the quadrature axis or Q-axis), corresponding to all possible symbols (because symbols are represented as complex numbers) that may be selected and/or used. In particular, each of the 16 constellation points (and thus the corresponding symbol) may correspond to a particular, unique 4-bit pattern (e.g., sequence of 4 bit values in a bit stream, such as in the input Tx_bitstream). For example, constellation point (−3, 3) may correspond to bit pattern (0, 0, 0, 0); constellation point (−1, 3) may correspond to bit pattern (0, 0, 0, 1), etc.

The constellation diagram 520 may represent an optimized/adjusted symbol constellation that is derived from a reference constellation, such as the constellation diagram 510. In this regard, the constellation diagram 520 may be particularly optimized for partial response based communication, as described, for example, with respect to FIG. 4. For example, because error patterns are multi-dimensional in partial response based implementations, the constellation diagrams utilized for symbol mapping need not necessarily be on a regular grid—e.g., the constellation points derived from the reference constellation diagram 510 need not be maintained in uniform rectangular placement. Rather, constellation points may be moved/adjusted to achieve, for example, optimized minimum distance reduction in accordance with identified or specified error patterns, or to change distance distribution of error patterns such that the overall symbol error rate (SER) may be improved. In other words, while in some instances partial response based communications may use an on-grid constellation (e.g., the constellation diagram 510), in some instances adjustments may be applied to the utilized symbol constellation such that the resulting constellation deviates from a strict uniform placement of constellation points. In this regard, the added flexibility in constellation point placement in partial response based implementations may allow for further performance enhancement, such as by allowing for optimization based on constellation adjustments to achieve a tradeoff in minimum distance to get some improvement in peak to average performance and/or signal's complementary cumulative distribution function (CCDF) parameters which may be related to performance under nonlinear distortion. For example, it may be determined that performance may be enhanced by moving the constellation point (3, 3) onto an arc between constellation points (1, 3) and (3, 1), as shown in FIG. 5.

The constellation adjustments may be determined, for example, on point-by-point basis. In some instances, however, to simplify the optimization process, adjustments to the location of one point may simply be replicated (for other point(s) where possible). In an embodiment, adjustments may be determined only for a single quadrant, and may then be copied onto the remaining three quadrants. For example, after determining and applying the adjustment to constellation point (3, 3), these changes may be copied (e.g., by mirroring them in the I-Q plane, relative to the I-axis and/or the Q-axis) into the three remaining quadrants in the I-Q plane, thus applying corresponding changes to the constellation points (3, −3), (−3, −3), and (−3, 3), as shown in FIG. 5.

Figure 6:
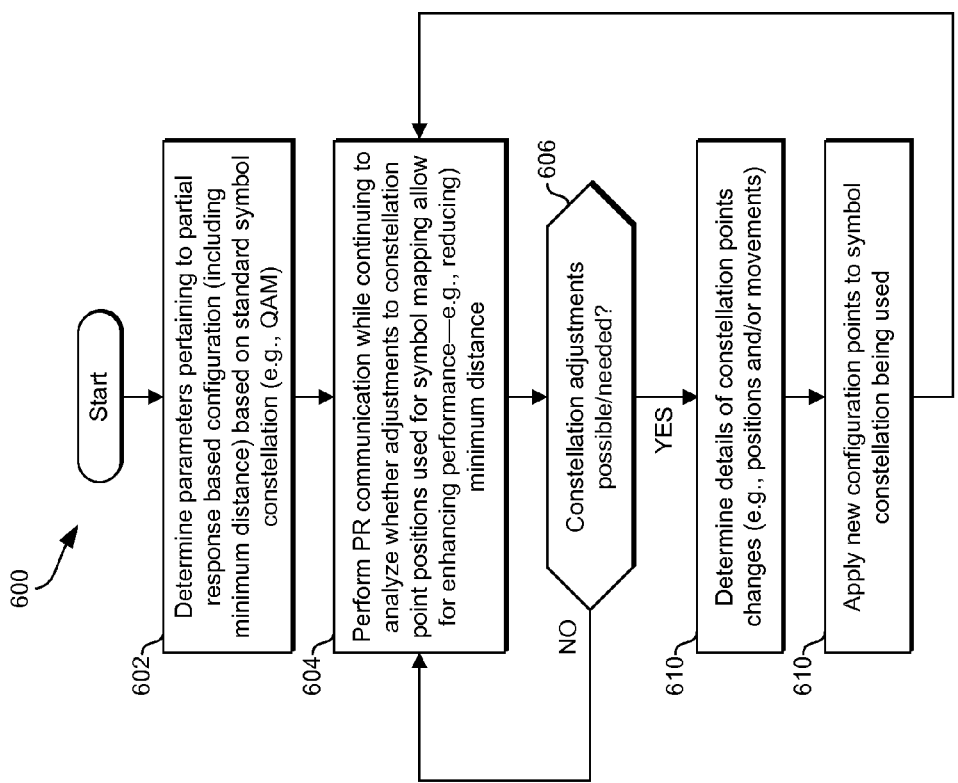
FIG. 6 is a flow chart depicting an example of a process for optimizing constellation symbol mappings, in accordance with an embodiment of the present invention.

FIG. 6 is a flow chart depicting an example of a process for optimizing symbol constellations, in accordance with an embodiment of the present invention. Referring to FIG. 6, there is shown a flow chart 700 comprising a plurality of exemplary steps for optimizing constellation symbol mappings, such as to optimize partial-response based communications.

In step 602, parameters pertaining to partial response based configuration (including minimum distance) may be determined. In this regard, the PR based parameters may be determined, as least in part, based on use of a standard symbol constellation (e.g., using a standard, "on-grid," 16-QAM symbols constellation) by the mapper 410 and 420. In some instances, the initial configuration of the symbol constellation may be optimized as well (e.g., off line). In step 604, PR communication may be performed while continuing to monitor for and/or analyze whether adjustments to symbol mapping/de-mapping operations performed by the mapper 410 and de-mapper 420 may be required—e.g., whether to move constellation point positions such as to allow for enhancing (e.g., reducing) minimum distance or improving symbol error rate. In step 606, it may be determined whether symbol mapping adjustments (e.g., adjustments to the symbol constellation used by the mapper 410 and the de-mapper 420) adjustments are needed and/or possible. In instances where it may be determined that symbol mapping adjustments are not needed OR are not possible, the process may loop back to step 604. In instances where it may be determined that symbol mapping are needed AND are possible, the process may proceed to step 608.

In step 608, details of the new symbol mapping may be determined. For example, new positions of constellation points in the utilized constellation diagram may be determined. The determination may be based on, for example, applicable minimum distances (or reductions thereof) and/or applicable error patterns (or vectors). If the symbol mapping adjustments include adjusting the symbol constellation being used, then, in step 610, the necessary symbol mapping adjustments the new constellation, may be determined. This may comprise, for example, determining movement of one or more constellation points in constellation diagram. The adjustments of the constellation points may be done iteratively until a desired goal (e.g., minimum distance and/or SER may be below particular threshold(s)) may be reached.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for constellation map optimization for highly spectrally efficient communications.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present methods and/or apparatus may have been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method, comprising:
    adjusting, in a transmitter during run-time, a symbol constellation used for mapping data bits to be transmitted by the transmitter, wherein:
    the adjusting comprises moving a first one or more constellation points of the symbol constellation from a first position to a second position;
    the first position is a position of the first one or more constellation points in a reference symbol constellation; and
    a second one or more constellation point of the symbol constellation are not moved during said adjusting.

2. The method of claim 1, wherein the adjusting is based on optimizing an applicable minimum distance for one or more selected error patterns.

3. The method of claim 1, wherein the reference symbol constellation is an N-QAM (quadrature amplitude modulation) symbol constellation, N being an integer multiplication of 2.

4. The method of claim 1, wherein the reference symbol constellation comprises $\pm(2n+1)$ points on a regular grid, n being a positive integer.

5. The method of claim 4, wherein the second position is not on the regular grid.

6. The method of claim 5, wherein the adjusting is based on optimizing an applicable minimum distance for one or more selected error patterns and/or symbol error rate (SER).

7. The method of claim 1, comprising:
    when the symbol constellation used for mapping data bits resides in a two-dimensional quadrature plane, mirror images of said moves of said first one or more constellation points are applied to a third one or more constellation points, and an in-phase axis (I-axis) and a quadrature axis (Q-axis) are lines of reference for said mirror images.

8. The method of claim 1, comprising adjusting the symbol constellation based on feedback information from the transmitter, feedback information from a receiver, and/or channel related feedback information.

9. The method of claim 8, wherein the feedback information from the receiver comprises data relating to symbol error rate (SER), signal to noise ratio (SNR), and/or channel estimation.

10. The method of claim 8, wherein the feedback information from the receiver comprises data relating to backoff settings, frequency, and/or temperature.

11. The method of claim 1, comprising adjusting a pulse shaping filter of the transmitter based on the adjusting of the symbol constellation, wherein the pulse shaping filter is configured for transmission of inter-symbol correlated (ISC) signals.

12. The method of claim 11, wherein the pulse shaping filter is a partial response filter.

13. A system, comprising:
    one or more circuits in a transmitter for adjusting, during run-time, a symbol constellation used for mapping data bits to be transmitted by the transmitter, wherein:
    the adjusting comprises moving a first one or more constellation points of the symbol constellation from a first position to a second position;
    the first position is a position of the first one or more constellation points in a reference symbol constellation; and
    a second one or more constellation point of the symbol constellation are not moved during said adjusting.

14. The system of claim 13, wherein the adjusting is based on optimizing an applicable minimum distance for one or more selected error patterns and/or symbol error rate (SER).

15. The system of claim 13, wherein the reference symbol constellation is an N-QAM (quadrature amplitude modulation) symbol constellation, N being an integer multiplication of 2.

16. The system of claim 13, wherein the reference symbol constellation comprises $\pm(2n+1)$ points on a regular grid, n being a positive integer.

17. The system of claim 16, wherein the second position is not on the regular grid.

18. The system of claim 17, wherein the adjusting is based on optimizing an applicable minimum distance for one or more selected error patterns.

19. The system of claim 13, wherein the one or more circuits are operable to:
    when the symbol constellation for mapping data bits resides in a two-dimensional quadrature plane,
    mirror images of said moves of said first one or more constellation points are applied to a third one or more constellation points, and an in-phase axis (I-axis) and a quadrature axis (Q-axis) are lines of reference for said mirror images.

20. The system of claim 13, wherein the one or more circuits are operable to adjust the symbol constellation based on feedback information from the transmitter, feedback information from a receiver, and/or channel related feedback information.

21. The system of claim 20, wherein the feedback information from the receiver comprises data relating to symbol error rate (SER), signal to noise ratio (SNR), and/or channel estimation.

22. The system of claim 20, wherein the feedback information from the receiver comprises data relating to transmit power, backoff settings, frequency, and/or temperature.

23. The system of claim 13, wherein the one or more circuits are operable to adjust a pulse shaping filter of the transmitter based on the adjusting of the symbol constellation, wherein the pulse shaping filter is configured for transmission of inter-symbol correlated (ISC) signals.

24. The system of claim 23, wherein the pulse shaping filter is a partial response filter.

* * * * *